United States Patent [19]

Bridges et al.

[11] Patent Number: 4,834,177
[45] Date of Patent: May 30, 1989

[54] UNIDIRECTIONAL FILTER FOR HYDRAULIC SYSTEMS

[75] Inventors: Charles D. Bridges, Houston, Tex.; Kenneth J. Hartwein, New Orleans, La.

[73] Assignees: Vetco Gray Inc.; Shell Offshore Inc., both of Houston, Tex.

[21] Appl. No.: 125,623

[22] Filed: Nov. 25, 1987

[51] Int. Cl.[4] .................. B01D 27/10; B01D 35/14; B01D 35/02
[52] U.S. Cl. .................. 166/250; 166/375; 210/130; 210/136; 210/137; 210/167; 210/170
[58] Field of Search ............. 210/130, 136, 137, 167, 210/168, 170, 117; 166/374, 375, 205, 325, 326, 250

[56] References Cited

U.S. PATENT DOCUMENTS

| | | | |
|---|---|---|---|
| 2,895,613 | 7/1959 | Griffiths | 210/130 |
| 3,589,517 | 12/1968 | Palmai | 210/130 |
| 3,814,250 | 6/1974 | Mezger | 210/130 |
| 3,906,994 | 9/1975 | Schon | 210/130 |
| 3,996,137 | 12/1976 | Cooper | 210/136 |
| 4,051,031 | 9/1977 | Suzuki | 210/136 |
| 4,246,109 | 1/1981 | Manders | 210/130 |
| 4,279,746 | 7/1981 | Leutz | 210/130 |
| 4,469,594 | 9/1984 | Poetter | 210/136 |
| 4,519,434 | 5/1986 | Prudhomme | 210/136 |

*Primary Examiner*—David L. Lacey
*Assistant Examiner*—Thomas M. Lithgow
*Attorney, Agent, or Firm*—James E. Bradley

[57] ABSTRACT

A hydraulic system has a filter that filters only when the fluid is flowing in one direction. The filter is located in a flow passage between a hydraulic fluid source and a valve in a well. The source supplies hydraulic fluid pressure in a forward direction to keep the valve open. A bypass passage allows hydraulic fluid to bypass the filter. A check valve located in the bypass passage prevents forward flowing fluid from flowing through the bypass passage. If hydraulic pressure is lost, hydraulic fluid will return through the bypass passage, rather than flowing through the filter, to allow the valve to quickly close.

3 Claims, 2 Drawing Sheets

UNIDIRECTIONAL FILTER FOR HYDRAULIC SYSTEMS

BACKGROUND OF THE INVENTION

1. Field of the Invention

This invention relates in general to filtering hydraulic fluid in hydraulic systems, and in particular to a filter for the hydraulic fluid supplied to a surface or subsurface control valve on an oil or gas well.

2. Description of the Prior Art

High pressure oil and gas wells employ hydraulically actuated safety valves for the control of the well. The valve is located in the tubing below the surface. Hydraulic fluid pressure is supplied to the valve to keep the valve open. In the event that hydraulic fluid pressure fails, the valve automatically closes to prevent further flow of production fluid up the tubing.

Particularly for high pressure applications, 15,000 psi to 20,000 psi, it is important to keep the sealing areas of the valve hydraulically actuated components free of any debris. Otherwise, leakage past the valve might occur. It is also important that the valve be free to close very quickly once the hydraulic fluid pressure is relieved.

Filters are employed in prior art hydraulic systems in general to filter hydraulic fluid. However, generally the filters do not have a high density. As a result, smaller particles of debris may flow past the filter. The reason that the filters are not of very high density is to prevent the filter from creating too much of a pressure drop. A high density filter would impede the reverse flow of hydraulic fluid in the event of a hydraulic pressure fluid loss on a well safety valve system. This impediment to the reverse flow of hydraulic fluid would slow the closing of the valve.

SUMMARY OF THE INVENTION

A filter is provided for a high pressure hydraulically actuated valve. This filter is located in a flow passage that leads to the actuator of the valve. The filter is of steel mesh and of high density.

To prevent the filter from impeding reverse flow of hydraulic fluid, a bypass passage is used. This bypass passage contains a check valve. The check valve allows reverse flow bypassing the filter. The check valve blocks forward flow through the bypass passage, forcing all of the fluid flowing in the forward direction to flow through the filter.

DESCRIPTION OF THE PREFERRED EMBODIMENT

Figures 1, 3:
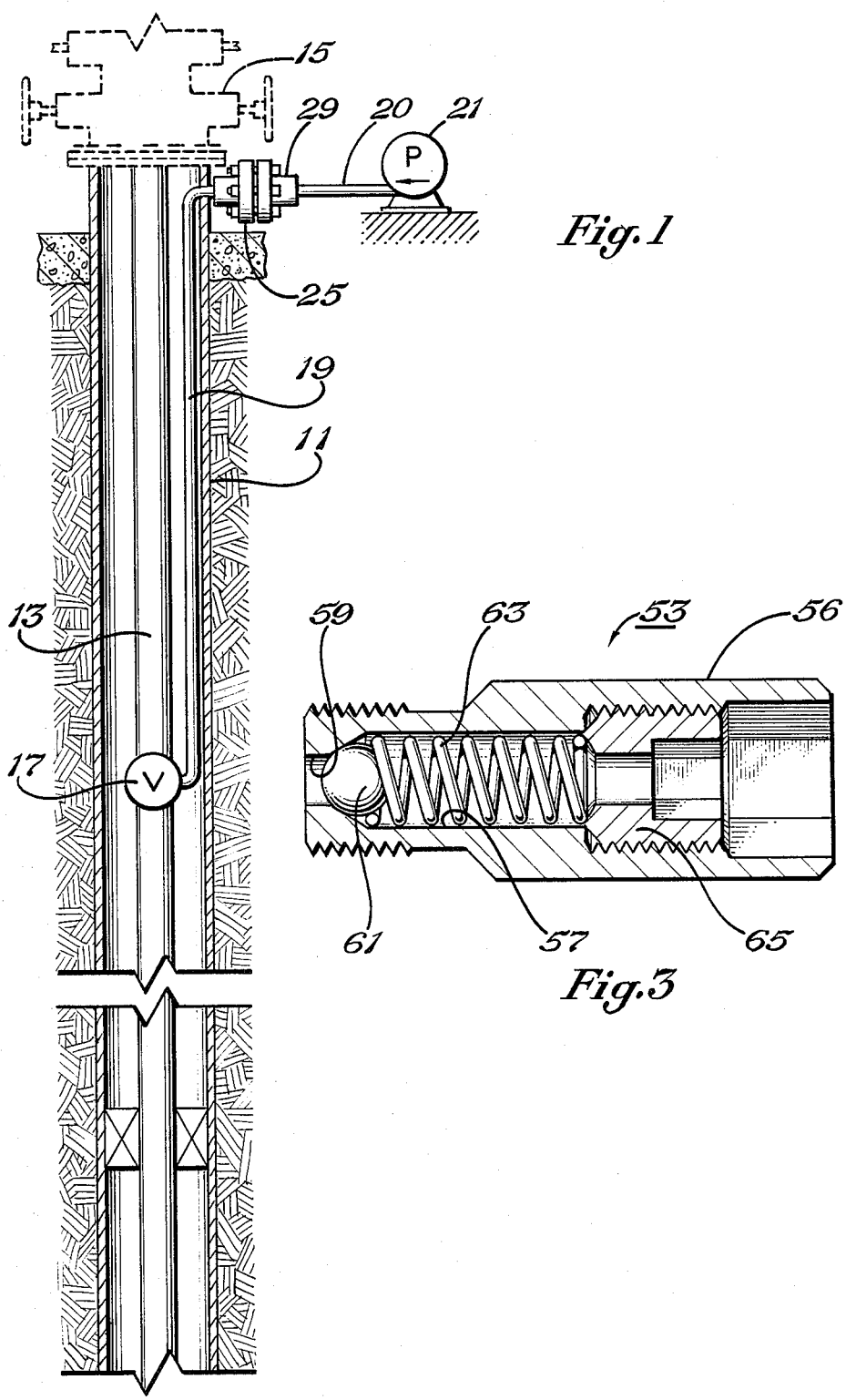
FIG. 1 is a schematic view illustrating a well having a safety valve and a filter constructed in accordance with this invention.
FIG. 3 is an enlarged vertical sectional view of a check valve for use with the filter of FIG. 2.

Referring to FIG. 1, the well has casing 11. A string of tubing 13 extends concentrically into the well to provide a conduit for the flow of production fluid from the well. A Christmas Tree 15 is located at the top of the well to control the flow of production fluid.

A safety valve 17 is located approximately 100-600 feet, or deeper as well conditions dictate, below the surface. The safety valve 17 is of a conventional type. It remains open so long as it is supplied with hydraulic fluid pressure. A spring (not shown) forces the valve 17 to close in the event of hydraulic fluid pressure loss. Valve 17 is connected to a line 19 leading to the top of the well. A line 20 leads from a pump 21 for supplying hydraulic fluid to the valve 17.

Figure 2:
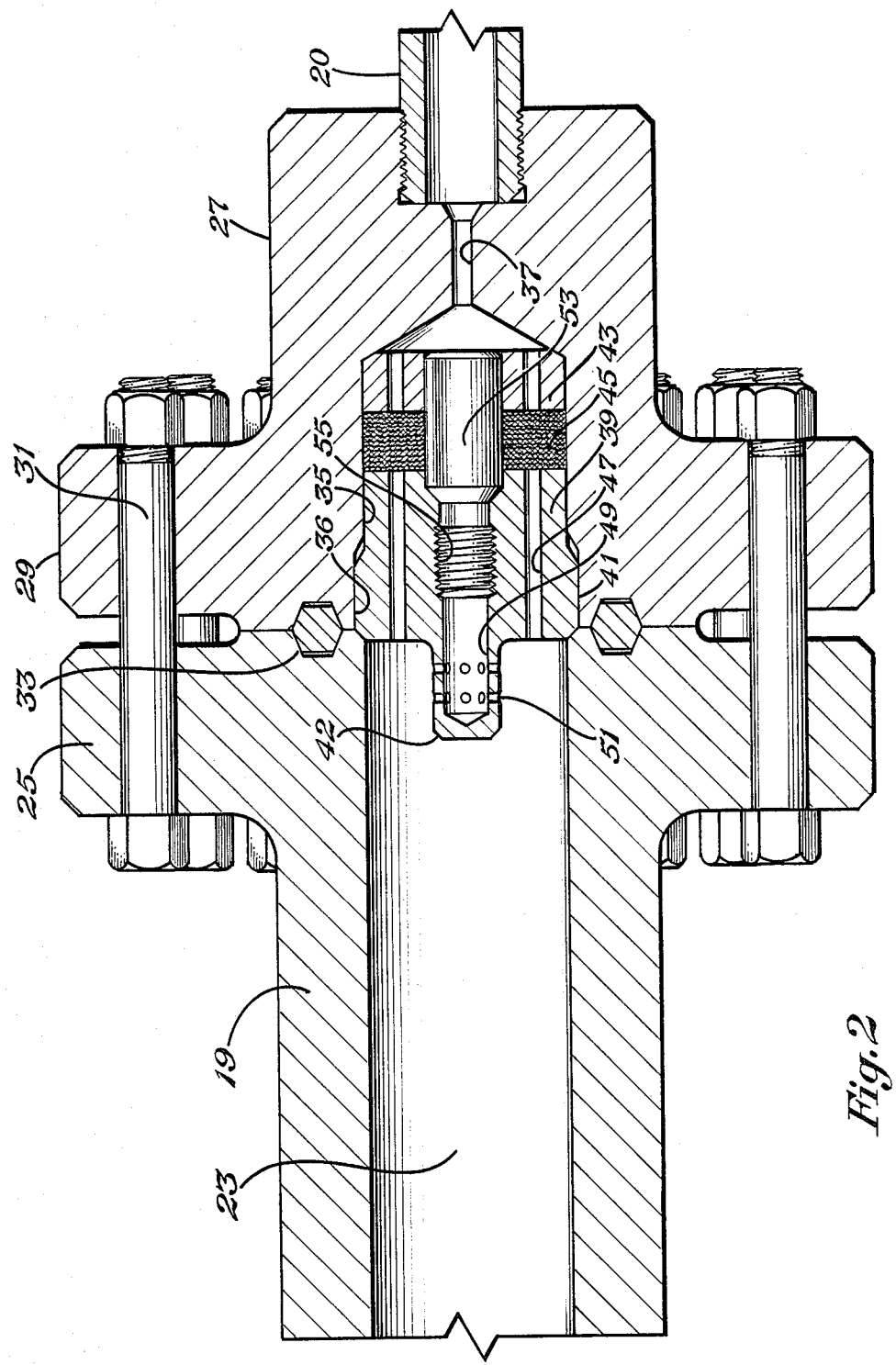
FIG. 2 is an enlarged vertical sectional view of a filter assembly for use with the hydraulic system of FIG. 1.

Referring to FIG. 2, line 19 has a flow passage 23 extending through it for communicating fluid from the pump 21 (FIG. 1) to the valve 17 (FIG. 1). A flange 25 or a suitable connection is located on the end of line 19. A connector body 27 is secured to the end of line 20, which leads to the pump 21 (FIG. 1). Body 27 has a flange 29 on its end that abuts against the flange 25. Bolts 31 secure the flanges 25 and 29 tightly together. A seal ring 33 located in the abutting faces of the flanges 25, 29, seals the flow passage 23. The body 27 has a cylindrical, co-axial cavity 35. Cavity 35 has a counterbore 36 of slightly larger diameter on the outer end. A much smaller diameter passaage 37 extends from the line 20 to the cavity 35.

A filter body 39 is received in the cavity 35. Filter body 39 has an enlarged portion 41 that is tightly received in the counterbore 36. A neck 42 is located on an end of the filter body 39 and protrudes into the flow passage 23.

A compression plate 43 is located on the opposite end from neck 42. A filter 45 is sandwiched between the filter body 39 and the compression plate 43. The end of line 19 exerts a force on the filter body 39 when the flanges 25, 29 are clamped together. This force compresses the filter 45 between the filer body 39 and the compression plate 43, which bears against the inner end of the cavity 35.

Filter 45 is an annular disk-shaped metal mesh filter of high density. The filter 45 has a cylindrical periphery tht has an outer diameter the same as the walls of the cavity 35. A plurality of forward direction passages 47 extend through the filter bbody 39 and the plate 43. The filter 45 blocks the passages 47, requiring all hydraulic fluid flowing through the passages 47 to flow through the filter 45. Hydraulic fluid flowing in a forward direction through the line 20 will pass through the passages 47 and through the filter 45.

A bypass passage 49 is located on the longitudinal axis of the filter body 39. The bypass passage 49 extends into the filter body 39 and terminates in the neck 42, where a plurality of ports 51 communicate the flow passage 23 with the bypass passage 49.

A check valve 53 is secured inside the bypass passage 49. Check valve 53 extends through an axial hole in the plate 43, an axial hole in the filter 45 and is secured to the filter body 39 by threads 55. Referring to FIG. 3, the check valve 53 is of a conventional type. It has a cylindrical body 56 that locates tightly in the bypass passage 49 and in the axial holes in the plate 43 and filter body 39. An axial passage 57 extends through the body 56. An inlet 59 is located on the forward end. Inlet 59 is of smaller diameter than the passage 57. A ball 61 is carried in the passage 57. A coiled spring 63 urges the ball 61 forward to contact a seat located at the junction of the inlet 59 and the passage 57. A threaded retainer 65 secures the spring 63 in place.

In operation, the pump 21 will pump hydraulic fluid through lines 19 and 20 to the valve 17 to cause it to open. Referring to FIG. 2, the forward direction flow of hydraulic fluid passes through the passage 37, passages 47 and into the flow passage 23. The check valve 53 blocks any forward flow through the bypass passage 49. The flow passes through the filter 45, which filters debris to a high degree. Although there will be a large pressure drop because of the high density of the filter 45, this will not be detrimental. The valve 17 will open, although possibly slower than if no filter 45 were present.

Once the valve 17 opens, hydraulic fluid pressure is maintained in the lines 19 and 20. Should, due to an accident, storm or other occurrence, the hydraulic pressure be lost in line 20, the spring in the valve 17 will tend to cause it to close. As the valve 17 closes, the actuator (not shown) strokes back, pushing hydraulic fluid in passage 23 (FIG. 2) in a reverse direction. The reverse flow of hydraulic fluid enters the ports 51 and flows through the check valve 53. As shown in FIG. 3, the fluid will cause the ball 61 to unseat and the fluid to flow through the passage 57. Because of the high density of the filter 45, little of the fluid will flow in a reverse direction through the passages 47. Rather the fluid will take the easier path through the check valve 53. The spring 63 has a light pressure so as to allow the fluid to freely flow back to the pump 21. This allows the valve 17 to quickly close.

The invention has significant advantages. Placing a high density filter in the line prevents debris from entering the seals of the valve. The bypass passage and check valve allow the free flow of return fluid to allow the valve to quickly close.

While the invention has been shown in only one of its forms, it should be apparent to those skilled in the art that it is not so limited, but is susceptible to various changes without departing from the scope of the invention.

We claim:

1. In a well assembly having a conduit, a valve for opening and closing a passage in the conduit, pump means for supplying pressurized hydraulic fluid through a flow passage to the valve to maintain the valve open, the valve being of a type that closes when hydraulic fluid pressure is removed, the improvement comprising in combination:
   filter means located in the flow passage for filtering all of the hydraulic fluid through the flow passage moving in a forward direction toward the valve;
   bypass passage means for allowing hydraulic fluid in the flow passage to bypass the filter; and
   check valve means for preventing the flow of hydraulic fluid in the forward direction through the bypass passage means and for allowing the flow of hydraulic fluid in a reverse direction through the bypass passage means, to prevent the filter means from impeding the closing of the valve upon the loss of hydraulic fluid pressure.

2. In a well assembly having a conduit, a valve for opening and closing a passage in the conduit, pump means for supplying pressurized hydraulic fluid through a flow passage to the valve to maintain the valve open, the valve being of a type that closes when hydraulic fluid pressure is removed, the improvement comprising in combination:
   a disk-shaped mesh filter located in the flow passage for filtering all of the hydraulic fluid flowing through the flow passage moving in a forward direction toward the valve;
   a bypass passage extending through the filter for allowing hydraulic fluid in the flow passage to bypass the filter; and
   check valve means located in bypass passage for preventing the flow of hydraulic fluid in the forward direction through the bypass passage and for allowing the flow of hydraulic fluid in a reverse direction through the bypass passage, to prevent the filter from impeding the closing of the valve upon the loss of hydraulic fluid pressure.

3. In a hydraulic system having a flow passage for the passage of hydraulic fluid, the improvement comprising in combination:
   a cylindrical filter body located within the flow passage;
   at least one forward direction passage extending longitudinally through the filter body and in communication with the flow passage on each side of the filter body for causing all forward flowing hydraulic fluid in the flow passage to flow through the forward direction passage;
   a disk-shaped mesh filter in contact with the filter body and blocking the forward direction passage, for causing all forward flowing hydraulic fluid to flow through the filter;
   a bypass passage extending through the filter and through the filter body in communication with the flow passage on each side of the filter body; and
   check valve means located in bypass passage for preventing the flow of forward flowing hydraulic fluid through the bypass passage and for allowing the flow of hydraulic fluid in a reverse direction through the bypass passage, to allow hydraulic fluid flowing in the reverse direction to bypass the filter.

* * * * *